United States Patent
Coad et al.

(10) Patent No.: US 6,931,625 B1
(45) Date of Patent: Aug. 16, 2005

(54) METHOD AND SYSTEM FOR COLLAPSING A GRAPHICAL REPRESENTATION OF RELATED ELEMENTS

(75) Inventors: Peter Coad, Raleigh, NC (US); Dietrich Charisius, Stuttgart (DE); Alexander Aptus, Esslingen (DE)

(73) Assignee: Borland Software Corporation, Scotts Valley, CA (US)

( * ) Notice: Subject to any disclaimer, the term of this patent is extended or adjusted under 35 U.S.C. 154(b) by 532 days.

(21) Appl. No.: 09/680,064

(22) Filed: Oct. 4, 2000

Related U.S. Application Data

(60) Provisional application No. 60/157,826, filed on Oct. 5, 1999, and provisional application No. 60/199,046, filed on Apr. 21, 2000.

(51) Int. Cl.[7] .................................................. G06F 9/44
(52) U.S. Cl. ................ 717/109; 717/100; 717/113; 715/853; 715/514; 715/700; 715/805
(58) Field of Search .............................. 717/109, 100, 717/113, 108, 123; 715/513, 514, 530, 700, 713, 798, 800, 853, 967, 703

(56) References Cited

U.S. PATENT DOCUMENTS

| | | | | |
|---|---|---|---|---|
| 4,912,657 A | * | 3/1990 | Saxton et al. ................ | 715/853 |
| 5,537,630 A | * | 7/1996 | Berry et al. ................. | 345/763 |
| 5,701,137 A | * | 12/1997 | Kiernan et al. ............. | 715/853 |
| 5,895,474 A | * | 4/1999 | Maarek et al. .............. | 715/514 |
| 5,911,072 A | * | 6/1999 | Simonyi ..................... | 717/105 |
| 5,999,182 A | * | 12/1999 | Etchemendy et al. ....... | 715/853 |
| 6,097,888 A | * | 8/2000 | Simonyi ..................... | 717/144 |
| 6,189,143 B1 | * | 2/2001 | Simonyi ..................... | 717/109 |
| 6,377,281 B1 | * | 4/2002 | Rosenbluth et al. ........ | 715/700 |
| 6,606,105 B1 | * | 8/2003 | Quartetti .................... | 715/853 |
| 6,636,250 B1 | * | 10/2003 | Gasser ....................... | 715/853 |
| 6,642,946 B1 | * | 11/2003 | Janes et al. ................. | 715/854 |
| 6,754,885 B1 | * | 6/2004 | Dardinski et al. .......... | 717/113 |
| 6,823,495 B1 | * | 11/2004 | Vedula et al. ............... | 715/805 |

FOREIGN PATENT DOCUMENTS

| | | |
|---|---|---|
| EP | 1 030 242 A2 | 8/2000 |
| EP | 1 030 252 A1 | 8/2000 |

OTHER PUBLICATIONS

"Template Software Rolls Out Corporate and Product Growth Strategies at Solutions '97 Conference", PR Newswire, Apr. 3, 1997.*
"Template Software Stregthens Core Product Family With Ease–of–Use and Functional Enhancements that Promote Unparalleled Reuse", PR Newsire Association, Jun. 23, 1997.*
"Workflow Template Process Template Using the WFT Development Environment", Template Software, copyright 1998 Chapters 1–4.*
Rational Rose 4.0, Using Rational Rose 4.0 by Rational Software Corporation, whole manual , Nov. 1996.*
Rational Rose 4.0 , Rational Rose/ c++, Round Trip Engineering with Rational Rose, Whole manual, Nov. 1996.*

(Continued)

*Primary Examiner*—Todd Ingberg
(74) *Attorney, Agent, or Firm*—MacCord Mason PLLC

(57) ABSTRACT

Methods and systems consistent with the present invention provide an improved software development tool that simplifies a graphical representation of software code for a developer. The software development tool provides the developer with a more coherent, manageable, and abstract graphical view of the project model, and facilitates the developer in graphically debugging and editing the associated software code. The improved software development tool detects a group of related elements in the code, and collapses a portion of the graphical representation of the code associated with the group of related elements.

43 Claims, 8 Drawing Sheets

OTHER PUBLICATIONS

Margaret M. Burnett et al., "Visual Object–Oriented Programming Concepts and Environments," Chapters 1–2.

Erich Gamma et al., "Design Patterns Elements of Reusable Object–Oriented Software," Chapter 1.

Penz, F, "Visual Programming in the Objectworld," Journal Visual Lanagues and Computing, Mar. 1991, vol. 2, p. 1741.

L. Vanhelsuwe, "Mastering JavaBeans," Sybex, Chapter 2.

Cliff Berg, "How Do I Create a JavaBean?" Dr. Dobb's Journal, Sep. 1997, p. 102–104.

The Source of JAVA Technology, java.sun.com, "Java: The First 800 Days".

David W. McIntyre, "A Visual Method for Generating Iconic Programming Environments," Aug. 1992, UMI Dissertation Services.

Using the SNAP Development Environment, SNAP Version 8.0, Second Edition, 1998, Chapter 1, pp. 1–6; Chapter 2, pp. 1–57; Chapter 3, pp. 1–84.

* cited by examiner

FIG. 4

METHOD AND SYSTEM FOR COLLAPSING A GRAPHICAL REPRESENTATION OF RELATED ELEMENTS

CROSS-REFERENCE TO RELATED APPLICATIONS

The following identified U.S. patent applications are relied upon and are incorporated by reference in this application:

U.S. Provisional Application No. 60/157,826, entitled "Visual Unified Modeling Language Development Tool," filed on Oct. 5, 1999;

U.S. Provisional Application No. 60/199,046, entitled "Software Development Tool," filed on Apr. 21, 2000;

U.S. patent application Ser. No. 09/680,063 entitled "Method And System For Developing Software," and filed on the same date herewith;

U.S. patent application Ser. No. 09/680,065, entitled "Method And System For Displaying Changes Of Source Code," and filed on the same date herewith; and U.S. patent application Ser. No. 09/680,030, entitled "Method And System For Generating, Applying, And Defining A Pattern," and filed on the same date herewith.

FIELD OF THE INVENTION

The present invention relates generally to data processing systems and, more particularly, to methods and systems for collapsing a graphical representation of related elements.

BACKGROUND OF THE INVENTION

Software developers utilize conventional development tools that support the Unified Modeling Language (UML) for graphically modeling an object-oriented design of software projects. The well-known Unified Modeling Language (UML) is a general-purpose notational language for visualizing, specifying, constructing, and documenting complex software systems. UML is more clearly described in the following references, which are incorporated herein by reference: (1) Martin Fowler, *UML Distilled Second Edition: Applying the Standard Object Modeling Language*, Addison-Wesley (1999); (2) Booch, Rumbaugh, and Jacobson, *The Unified Modeling Language User Guide*, Addison-Wesley (1998); (3) Peter Coad, Jeff DeLuca, and Eric Lefebvre, *Java Modeling in Color with UML: Enterprise Components and Process*, Prentice Hall (1999); and (4) Peter Coad, Mark Mayfield, and Jonathan Kern, *Java Design: Building Better Apps & Applets* (2nd Ed.), Prentice Hall (1998).

These development tools use graphical notation to depict elements within the process or project being modeled. For example, a class diagram is typically used to describe both object (association) relationships and class (inheritance) relationships. The amount of detail presented on the class diagram depends on the development tool. Generally, a class diagram lists the name of the class, the class' important attributes, and the class' important methods. Related classes or objects of classes are denoted graphically by adding a graphical link notation to convey an inheritance, a single or bi-directional association (e.g., one object sends messages to another), or other relationships which add necessary complexity to the design when viewed as a whole.

Conventional development tools generally become difficult to use for complex models. As multiple classes are defined and multiple relationships are extended, the graphical representation becomes more of a burden. Faced with this problem, a software developer eventually will abandon the model as a system design development tool. For example, a developer looking to debug an existing design or to revise an existing model of a software program to conform to new requirements (e.g., new inventory scheme for suppliers) may become frustrated when viewing a detailed, complex model, and decide to debug or edit the source code directly. Typically, the developer will then add a patch of code that does not conform to good design practices rather then spend time understanding the complex graphical view of the model.

Conventional design tools that provide a graphical representation of code associated with modeling a business process or software project present an incoherent and unwieldy graphical view of the code when the respective model is complex. It is therefore desirable to simplify the graphical representation of software code in a modeling tool.

SUMMARY OF THE INVENTION

Methods and systems consistent with the present invention provide an improved software development tool that simplifies a graphical representation of software code for a developer. The software development tool provides the developer with a more coherent, manageable, and abstract graphical view of the project model, and facilitates the developer in graphically debugging and editing the associated software code.

In accordance with methods and systems consistent with the present invention, a method is provided in a data processing system for simplifying the graphical representation of the code. The code has a first related element and a second related element. The method comprises the steps of detecting the first related element, detecting the second related element, and displaying a representative symbol in lieu of the graphical representation of the first related element and the second related element.

In accordance with articles of manufacture consistent with the present invention, a computer-readable medium is provided. The computer-readable medium contains instructions for controlling a data processing system to perform a method. The data processing system has code having a first related element corresponding to a first participant in a pattern and a second related element corresponding to a second participant in the pattern. The method comprises the steps of detecting the first related element, detecting the second related element, and displaying a representative symbol in lieu of the graphical representation of the first related element and the second related element.

Additional implementations are directed to systems and computer devices incorporating the methods described above. It is also to be understood that both the foregoing general description and the detailed description to follow are exemplary and explanatory only and are not restrictive of the invention, as claimed.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 4 depicts an exemplary screen displaying a representative symbol of the related elements graphically represented in FIG. 2 after collapsing by the software development tool depicted in FIG. 1;

Figure 1:
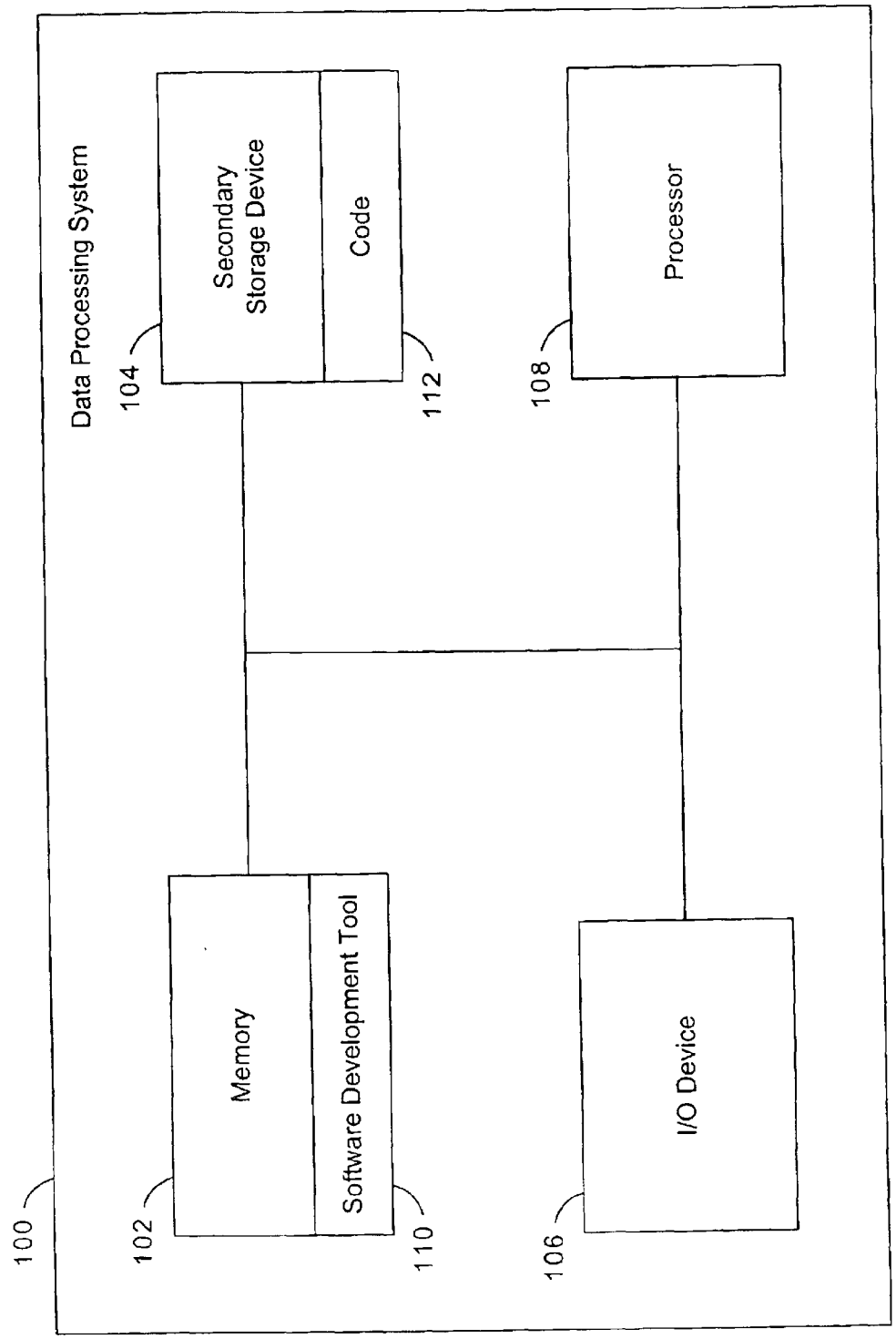
FIG. 1 depicts a block diagram of a data processing system for modeling a software design in accordance with methods and systems consistent with the present invention.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

DETAILED DESCRIPTION OF THE INVENTION

Methods and systems consistent with the present invention provide an improved software development tool which simplifies a graphical representation of software code to allow a developer to easily view a complex or unwieldy model of a software project without affecting the associated code. By collapsing the graphical notation for groups of related elements utilized in the software code, the software development tool simplifies the graphical view of the software code to allow a developer to focus on the important components and interactive flow of his/her software project and to assist the developer in debugging a design problem or in adding functionality to an already complex design.

Overview

The improved software development tool is used in a data processing system for developing software code associated with a project. The software code includes a group of related elements. An element of the group of related elements may be a class, an object of a class, or an interface (i.e., a software construct that unrelated objects use to interact with one another) as well as an attribute, or method associated with a class or an object. The group of related elements to be collapsed may also be participants in a pattern.

A pattern is a reusable solution to a recurring problem that occurs during software development. A pattern contains the following characteristics: a meaningful pattern name that reflects the knowledge and structure of the pattern; the underlying problem solved and the context in which the problem seems to recur; the solution in terms of its participants (e.g., classes, object of classes, and interfaces) and the relationships between its participants (e.g., static and dynamic rules for composition, inheritance, and instantiation). The software development tool generates code corresponding to a known pattern as described in U.S. patent application Ser. No. 09/680,030, entitled "Method And System For Generating, Applying, Defining A Pattern" that has previously been incorporated herein. In the process of generating source code for a pattern as described, the software development tool will store pattern identification information in a comment field associated with the pattern source code. After receiving an indication to simplify the graphical representation of the group of related elements, the software development tool detects the group of related elements from all other elements in a code based on an identification provided for one of the related elements or based on an element being a participant in a pattern. Where detection is based on a pattern, the software development tool may utilize pattern identification information embedded in comment fields of the code to locate a related element. Next, the software development tool identifies relationships (e.g., associations between object elements or inheritance between class elements) between the group of related elements. The software development tool then collapses the graphical representation of the group of related elements into a condensed view or a representative symbol. Identified relationships may be displayed in association with the representative symbol.

Implementation Details

In FIG. 1, an illustrative data processing system 100 suitable for practicing methods and systems consistent with the present invention is shown. The data processing system 100 in one implementation includes a memory 102, a secondary storage device 104, an I/O device 106, and a processor 108. Secondary storage device 104 includes code 112 that has a group of related elements which may be associated with a pattern. Memory 102 includes an improved software development tool 110 for collapsing a graphical representation of the group of related elements into a condensed view. One skilled in the art will recognize that data processing system 100 may contain additional or different components.

Although aspects of the present invention are described as being stored in memory, one skilled in the art will appreciate that these aspects can also be stored on or read from other types of computer-readable medium, such as secondary storage devices (e.g., hard disks, floppy disks, or CD-ROM); a carrier wave from a network, such as the Internet; or other forms of RAM of ROM either currently known or later developed. In the following pages, the functionality and details of the software development tool's collapsing functionality are described.

Figure 2:
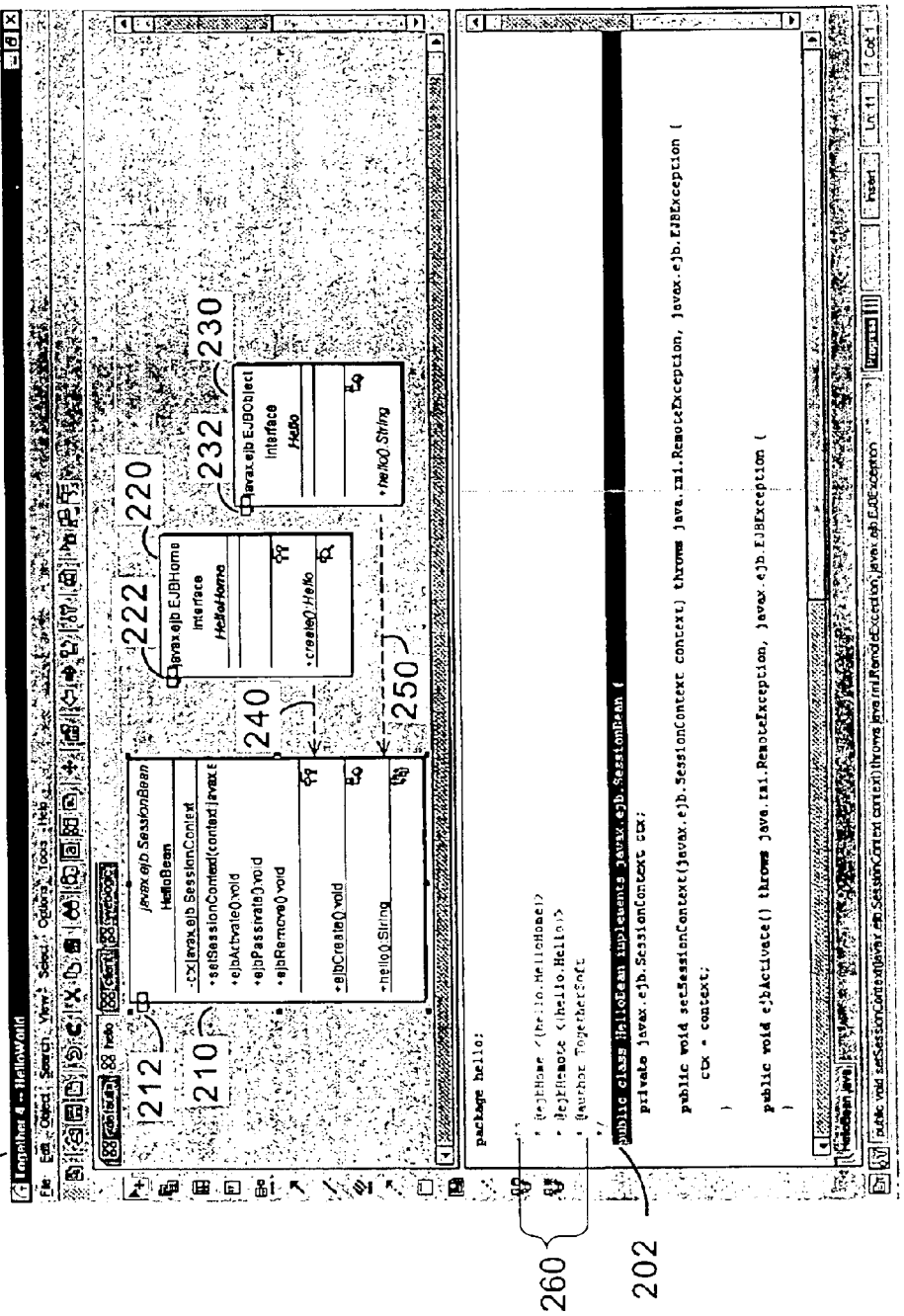
FIG. 2 depicts an exemplary screen displaying a graphical representation of related elements prior to collapsing by the software development tool depicted in FIG. 1.

FIG. 2 depicts a screen 200 displaying an exemplary graphical representation of related elements prior to collapsing. One element of the group of related elements is a class or an object of a class. An element of the group of related elements could also be an interface, attribute, or method associated with a class or object. One element is related to another element if there is a common link between the two elements of the group, such as a known class relationship (e.g., inheritance) or a known object relationship (e.g., association or aggregation). In addition, the group of related elements can be associated with a pattern.

An example of an Enterprise Java Bean (EJB) Session Bean pattern is depicted in FIG. 2. An EJB Session Bean pattern includes an EJB Session Bean, a remote interface, and a home interface. The EJB Session Bean, when invoked by a remote client on an enterprise network, provides an extension of a business application on a network server. For example, a client may be a travel agent and the business application an airline reservation system. The EJB Session Bean manages processes or tasks defined by the remote interface and associated with the business application. For instance, a travel agent EJB Session Bean when invoked by the travel agent might handle creating a reservation by assigning a customer to a particular seat on a particular plane. A home interface associated with the EJB Session Bean provides the Session Bean's life cycle methods, such as methods for creating, removing, and finding an object of the Session Bean.

The group of related elements graphically represented in FIG. 2 that are participants in an EJB Session Bean pattern include: a class 202 (named "Hello Bean") which implements an EJB Session Bean and is graphically depicted by diagram 210, an interface (named "HelloHome" but not shown in FIG. 2) which extends Enterprise Java Bean Home and is graphically depicted by diagram 220, and an interface (named "Hello" but not shown in FIG. 2) which extends Enterprise Java Bean Object and is graphically depicted by diagram 230. The HelloHome interface that is graphically depicted by diagram 220 defines the life cycle methods (e.g., method for creating new bean objects of HelloBean class). The Hello interface that is graphically depicted by diagram 230 is a remote interface that defines the business methods that are implemented by HelloBean class 202.

The relationship between class 202 and the interface depicted by diagram 220 is graphically represented by link 240. Similarly, the relationship between class 202 and the interface depicted by diagram 230 is graphically represented by link 250. Both links 240 and 250 graphically depict a dependent, unidirectional association with class 202. In general, a remote client invokes or creates an object of the EJB class 202 (i.e., HelloBean) on a server to provide a communication link across an enterprise network between the remote client and a business application running on the server. A detailed explanation of the behavior and operation of an object implementing the class "HelloBean" is not required for an understanding of the collapsing performed by the software development tool 110.

Figure 3:
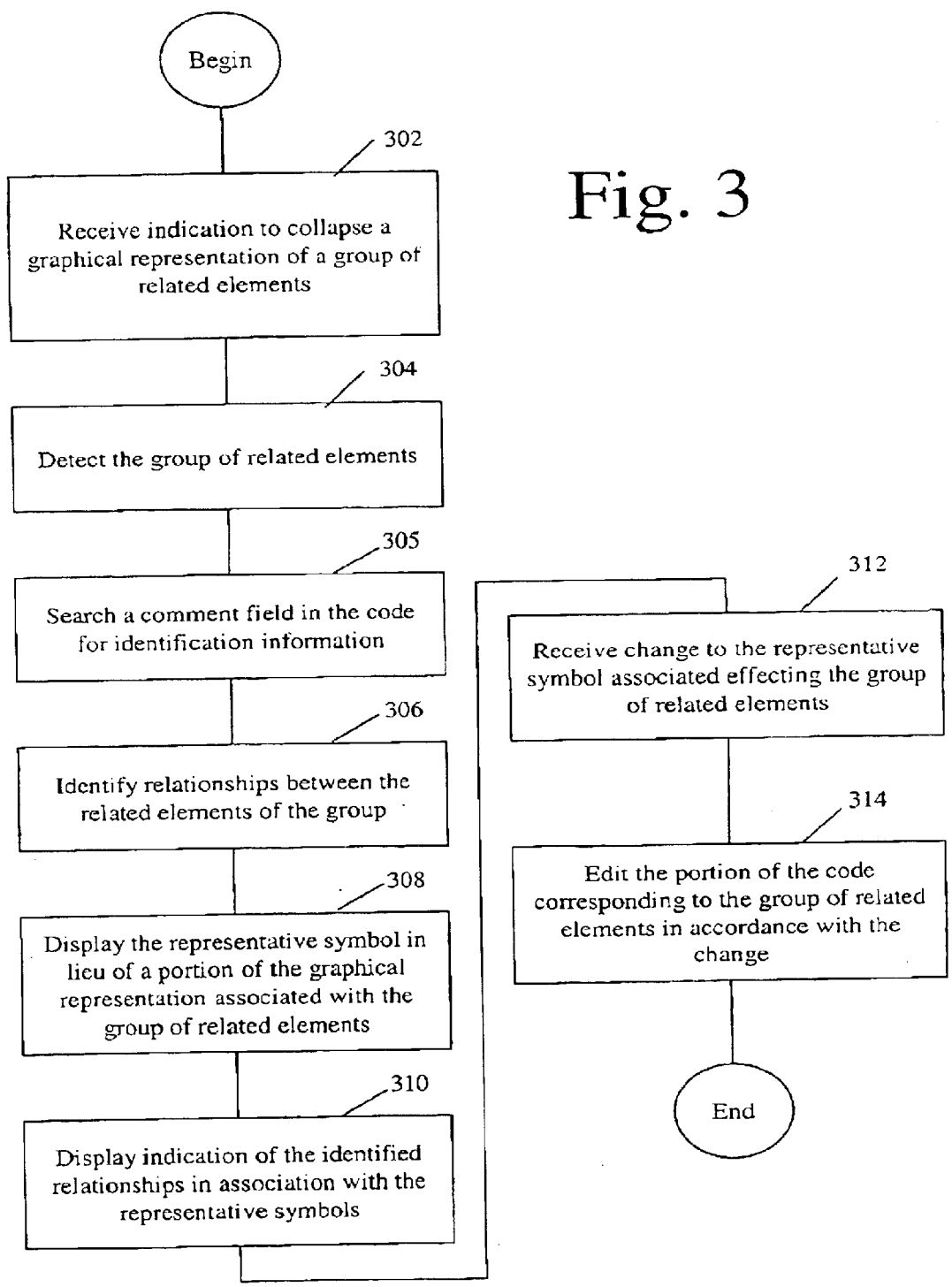
FIG. 3 depicts a flow chart for collapsing the graphical representation of related elements shown in FIG. 2 into a representative symbol.

FIG. 3 depicts a flowchart identifying the steps performed by a software development tool to collapse the graphical representation of software code having a group of related elements into a representative symbol. The software code is associated with a project having a plurality of files containing source code. The source code is suitable for compiling into an executable program. When compiled, the project forms a sequence of instructions to be run by a processor. The code, however, may be a graphical construct that is not suitable for compiling into an executable program without a conversion to a software language (e.g., Java™ programming language or C++). Initially, the software development tool 110 receives an indication to collapse a view or simplify the expanded graphical representation of the code (step 302). This collapse view indication may be provided using any known programming input technique, such as by selecting a respective option from a pull-down menu or by inputting the indication in a command line input. The indication also may be a combination of multiple collapse view inputs, where each collapse view input is associated with collapsing a particular group of related elements, such as the pre-defined EJB Session Bean pattern. In one implementation, the indication conveys that all groups of related elements in a graphical view are to be collapsed. In an alternative implementation, the indication conveys that selected groups of related elements are to be collapsed. For example, if a developer wishes to collapse the graphical representation of a single pattern instance that is currently in view, the developer can select one element of the group of related elements before providing the indication to collapse.

After receiving the collapse view indication, the software development tool 110 detects the group of related elements from all other elements in the code (step 304). It is contemplated that each element in the group of related elements in the code may be located in a separate file for a project. Therefore, the code may be distributed in a plurality of files.

In a determining step, the software development tool determines whether the first and the second related elements are related to each other, including a step of searching a semantic comment field in the code for identification information (step 305), as shown in FIG. 3.

In one implementation of the present invention, detecting the group of related elements includes searching the code for a pattern using detection rules associated with the pattern. In this implementation, each of the related elements corresponds to a participant in a pattern. For example, class 202, the interface depicted by diagram 220, and the interface depicted by diagram 230 correspond to participants in an Enterprise Java Bean (EJB) Session pattern.

Detection rules include searching the code for each participant by checking a comment in the code for pattern identification information (e.g., see EJB Session pattern identification information 260 in FIG. 2). Where pattern identification information is not available in a comment, the detection rules may utilize a heuristic that combines checking the code for common pattern naming conventions of pattern participants with searching the code for pattern constructs that correspond to properties or operations associated with a participant and that reflect the role the participant plays in the pattern. The examples that follow illustrate the software development tool's use of these detection rules to locate pattern participants in the code.

With reference to the example shown in FIG. 3, assuming that pattern identification information is not available, the detection rule heuristic for an EJB Session pattern calls for a class element to implement "javax.ejb.SessionBean." Thus, the code is searched for the code terms "class," "implement," and "javax.ejb.SessionBean." The detection rules for an EJB Session pattern also call for finding a home interface (a class implementing interface javax.ejb.EJBHome) and a remote interface (a class implementing interface javax.ejb.EJBObject) associated with the class implementing javax.ejb.SessionBean. The software development tool 110 may also graphically indicate that a pattern has been detected by placing a pattern collapsed tag in association with the participants of the pattern. For example, in FIG. 2 the tags 212, 222, and 232 indicate that the elements associated with diagrams 210, 220, and 230 are participants in a detected EJB pattern.

As illustrated in FIG. 3, the software development tool 110 next identifies the relationships between the group of related elements (step 306). Returning to FIG. 2, the software development tool 110 identifies the relationship between the class 202 and the interface depicted by diagram 220 after identifying that the interface depicted by diagram 220 has a name constructed with the base name of the class 202 and having a suffix "Home." The interface depicted by diagram 220 is then assigned a role of "Home Interface," and depicted as having a dependency relationship with HelloBean class 202. Similarly, the software development tool 110 identifies the dependency relationship between class 202 and the interface depicted by diagram 230 after identifying that the interface depicted by diagram 220 has the same property or event type as found in class 202. The interface depicted by diagram 230 is subsequently assigned the role of "Remote Interface."

Figure 4:
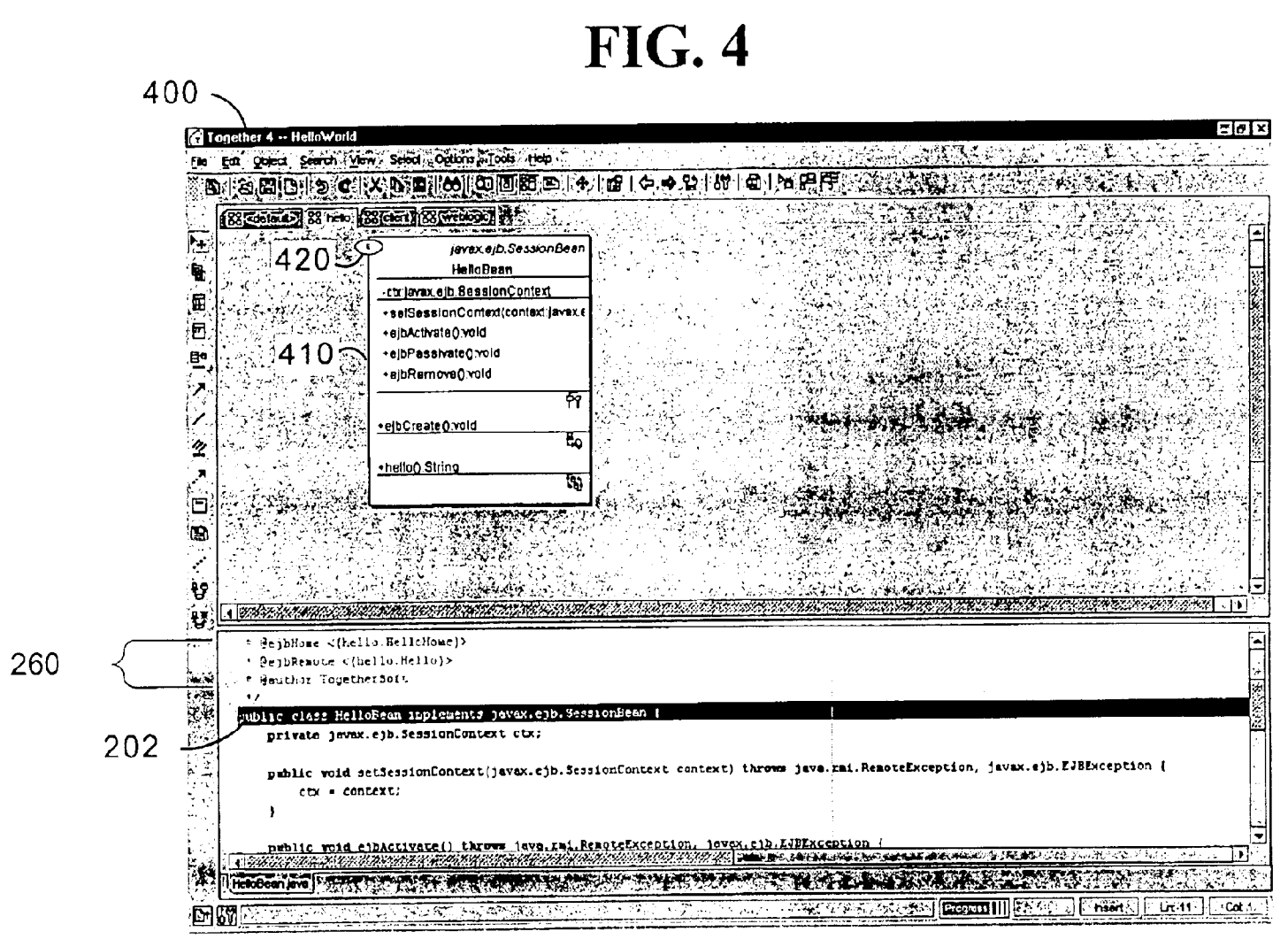

As shown in FIG. 3, the software development tool 110 displays a representative symbol in lieu of the portion of the graphical representation the code associated with the group of related elements (step 308), and displays an indication for each identified relationship between the related elements in association with the representative symbol (step 310). A representative symbol 410 depicted on screen 400 in FIG. 4 shows an exemplary collapsed view of the graphical representation of related elements for the EJB Session pattern depicted in FIG. 2. The oval pattern collapsed tag 420 reflects that the EJB Session pattern is collapsed into a representative symbol. In this implementation of collapsing, the graphical notations for the home interface depicted by diagram 220 and remote interface depicted by diagram 230 and their corresponding dependency relationship with class 202 are hidden in association with symbol 410. This allows the developer to advantageously have an unobstructed graphical view of other parts of his/her underlying code in context with the representative symbol 410 that represents the EJB Session object Hello Bean.

While in a collapsed state, the representative symbol may be modified (step 312). In response to the modification, the portion of the code associated with the group-of-related elements is automatically edited to correspond to the modification (step 314), even where the modification affects related elements that are hidden (i.e., home interface or remote interface) as a result of the collapsing.

Figure 5:
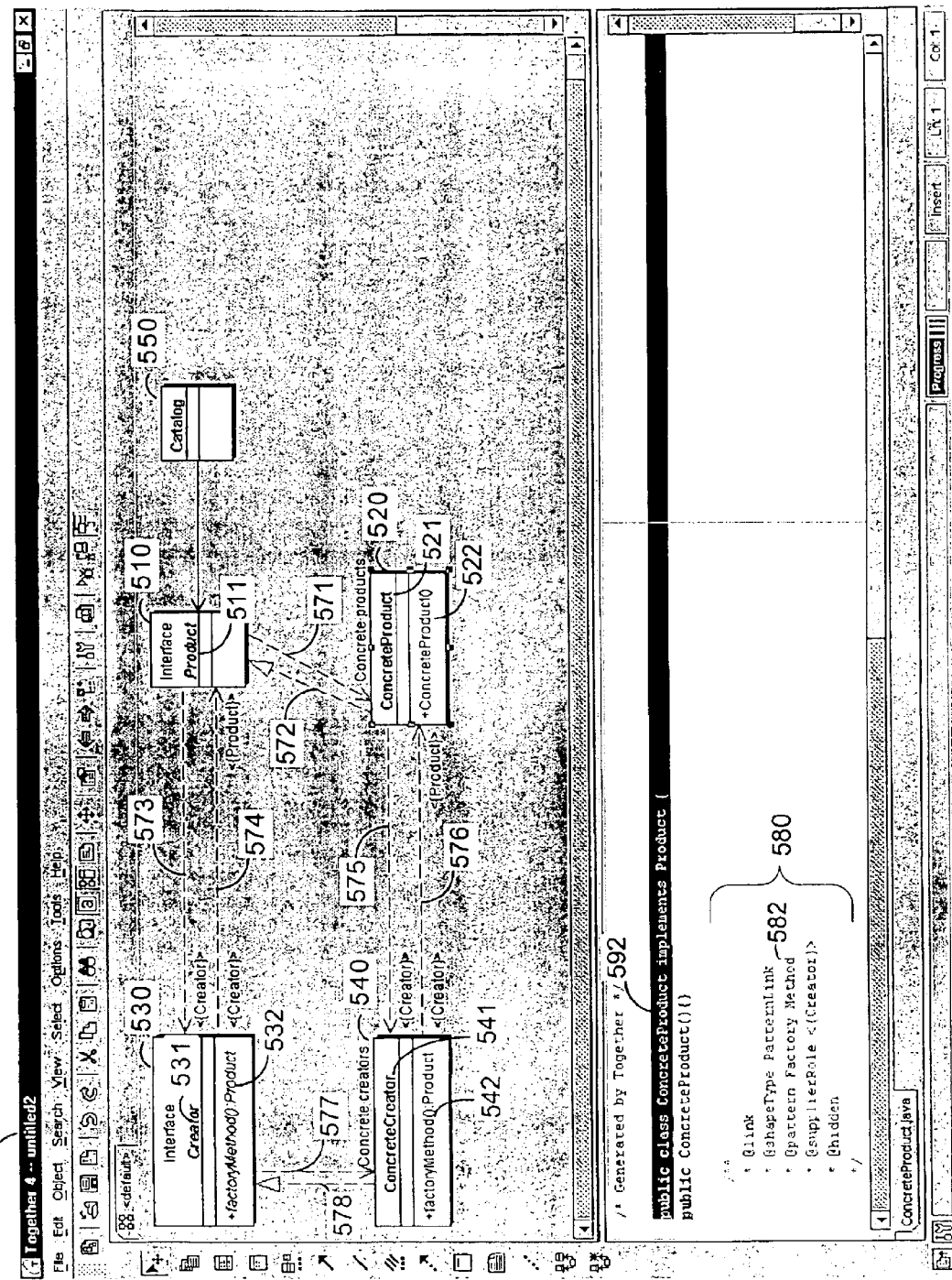
FIG. 5 depicts another exemplary screen displaying a graphical representation of related elements prior to collapsing by the software development tool depicted in FIG. 1.
Figure 6:
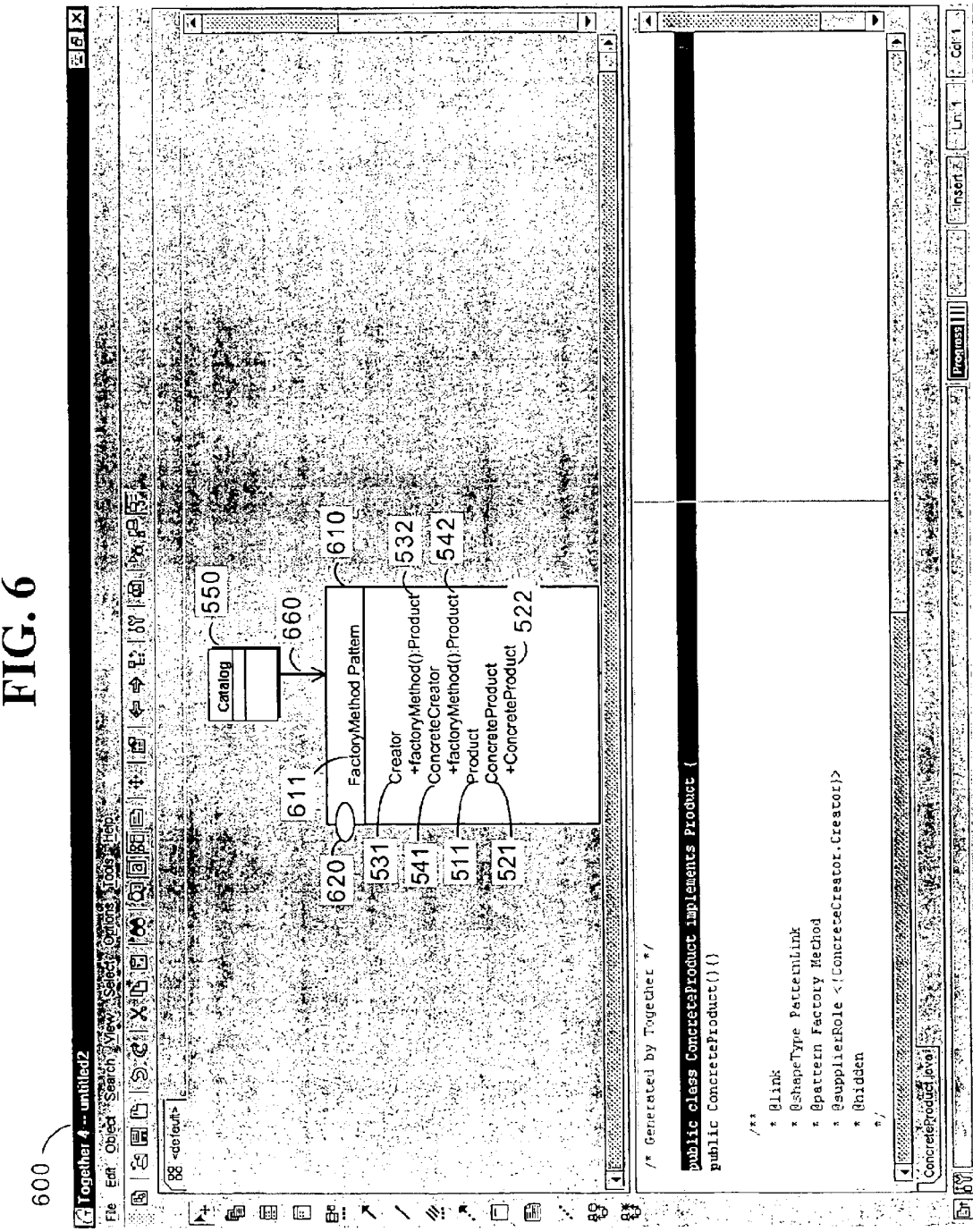
FIG. 6 depicts an exemplary screen displaying a representative symbol of the related elements graphically represented in FIG. 5 after collapsing by the software development tool depicted in FIG. 1.

In another implementation of collapsing discussed in reference to FIGS. 5 and 6, the graphical notation for the related group of elements in a pattern is not hidden but reflected on a representative symbol. In this implementation, the UML 110 performs the steps shown in FIG. 3 and described above to collapse the pre-defined factory method pattern shown on screen 500 in FIG. 5. The factory method pattern is a well-known Gang of Four pattern that is described in Gamma, Erich, et al. *Design Patterns: Elements of Reusable Object-Oriented Software*, Addison-Wesley (1995), which is incorporated herein by reference. One skilled in the art will appreciate, however, that methods and systems consistent with the present invention could be used in conjunction with any pattern. Other examples of patterns supported by the software development tool 110 are described in U.S. patent application Ser. No. 09/680,030, entitled "Method And System For Generating, Applying, And Defining A Pattern," which was previously incorporated by reference.

In general, the factory method pattern provides an application-independent object with an application-specific object to which it can delegate the creation of other application-specific objects. To accomplish this desirable design implementation, the factory method identifies the following as participants in its pattern, as shown in FIG. 5: a product interface which, graphically depicted by diagram 510, a concreteproduct class which is graphically depicted by diagram 520, a creator interface which is graphically depicted by diagram 530, and a concretecreator class which is graphically depicted by diagram 540. A detailed explanation of the behavior and operation of each participant in the factory method pattern is not required for an understanding of the collapsing performed by the software development tool 110.

After receiving an indication to collapse, the software development tool 110 detects the group of related elements or pattern participants, as previously discussed. To detect the factory method pattern shown in FIG. 5, the software development tool 10 may use the previously discussed detection rule of searching the code for comments that contain pattern identification information. For example, pattern identification information 580, which has the pattern identification name 582, is found in the code associated with the concrete product class 592. Thus, concreteproduct class 592 is identified as a participant in the factory method pattern.

Alternatively, the software development tool 110 may use the previously discussed pattern detection rule of checking the code for common pattern naming conventions to locate pattern participants. When a participant is found, the software development tool 110 then searches the code of the found participant for constructs that correspond to properties or operations associated with the participant and that reflect the role the participant plays in the pattern. Once the first participant is found in this manner, a second participant can be found if the role or operation played by the first participant uses a known identifier or return type which reflects a link to the second participant.

For example, to detect the participants in the factory method pattern shown in FIG. 5, the software development tool 110 searches all classes in the code for an operation construct that has the name "factorymethod." Code in FIG. 5 includes elements associated with graphical diagrams 510, 520, 530, 540, and 550. One skilled in the art will appreciate that all forms of spelling (i.e., capitalization) and word spacing for factory method would be attempted by the software development tool 110. Similarly, commonly known alternative names for the pattern or the pattern operation will be searched as well.

In FIG. 5, the software development tool 110 will find the class associated with diagram 540 as having the operation 542 named factorymethod. For the class associated with diagram 540 to conform to the concretecreator class, the software development tool 110 checks the factorymethod operation 542 to ensure it has no parameters or arguments that have a return type of "product," which is consistent with the factorymethod pattern constructs for this participant. Having found the return type of "product," the software development tool 110 searches the code for another class that implements an interface having the name "product." In this example, the software development tool 110 finds the concreteproduct class associated with diagram 520. By doing so, the software development tool 110 identifies the link or relationship between the two related participants. The software development tool 110 then finds an interface construct (depicted by diagram 510) in the code that implements or uses the name "product." Having found the participants depicted by diagrams 510, and 520, the software development tool 110 confirms that the class depicted by diagram 540 is playing the role of concretecreator in this factory method pattern. Consequently, the software development tool 110 can find the final participant in this pattern by searching the code for an interface (depicted by diagram 530) that implements or uses the same name as found in the concretecreator class participant and that has a factory method operation consistent with the concretecreator class.

Having detected the factory method, the software development tool 110 collapses the graphical representation of the factory method participants by displaying the representative symbol 610 in lieu of the portion of the graphical representation associated this group of related elements. The representative symbol 610 is depicted on screen 600 in FIG. 6. As a result of collapsing, the representative symbol 610 replaces the graphical diagrams or notations for product interface 510, concreteproduct 520, creator interface 530, and concretecreator class 540, as well as their respective links 571, 572, 573, 574, 575, 576, 577, and 578. The representative symbol 610 has a pattern name 611 displayed in association with the representative symbol 610 to reflect the type of pattern that has been collapsed. In addition, an oval tag 620 is placed on or in association with the representative symbol 610 to indicate that the symbol 610 represents a collapsed graphical representation of a pattern. Pattern participant names 511, 521, 531, and 541 are placed on or in association with the representative symbol 610. Furthermore, names of participant attributes and methods (e.g., 522, 532, and 542) are also placed on or in association with the representative symbol to reflect the relationships and operations of the collapsed pattern. Catalog class 550 after collapsing now has a graphical notation showing a link 660 to the representative symbol 610. While FIG. 6 does not reflect a complex code example, one skilled in the art will appreciate that by collapsing the factory method pattern the software development tool 110 provides a higher level of abstraction to the code so that the developer can better understand the structure and design of the code.

In another implementation, detecting the group of related elements may involve receiving an identification of one of the related elements to collapse, as previously described, locating the related element based on the identification, identifying the relationships of the element to other related elements in the group, and then locating the other related elements in the group based on the identified relationships.

Figure 7:
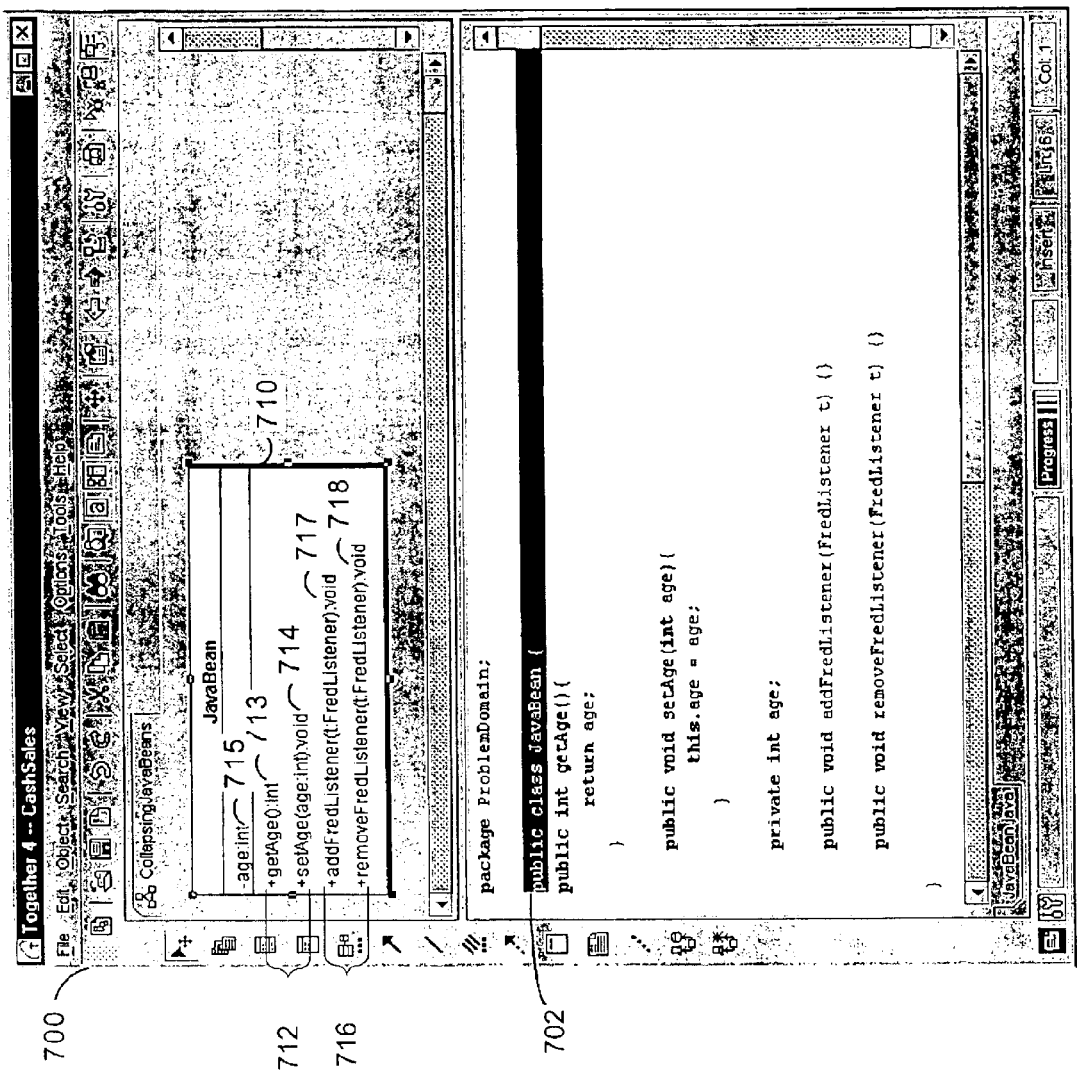
FIG. 7 depicts an exemplary screen displaying a graphical representation of related elements associated with a single diagram prior to collapsing by the software development tool depicted in FIG. 1.
Figure 8:
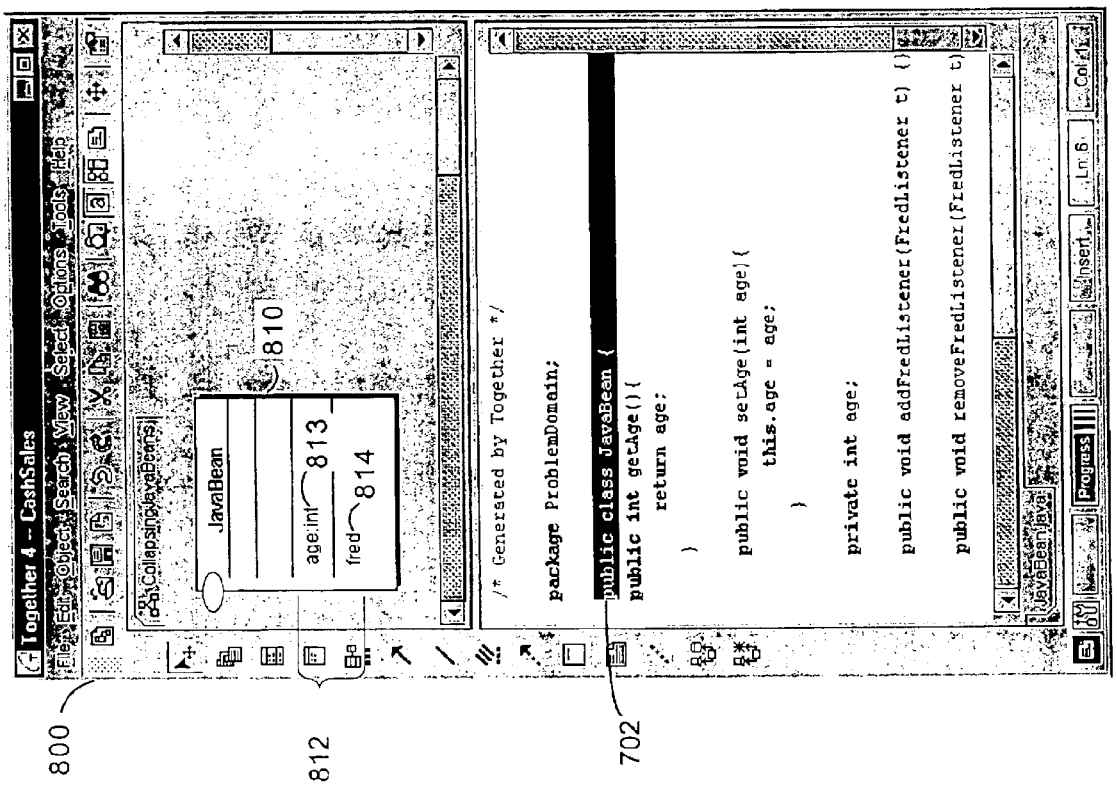
FIG. 8 depicts an exemplary screen displaying a representative symbol of the related elements graphically represented in FIG. 8 after collapsing by the software development tool depicted in FIG. 1.

In yet another implementation, a higher level of abstraction is achieved by collapsing the graphical representation of a group of related elements associated with a single diagram. In the example depicted on screen 700 in FIG. 7, a class JavaBean 702 depicted by diagram 710 has a method pair 712 that defines a property (i.e., graphically depicted as getAge( ) 713 and setage( ) 714, each being associated with an integer property type 715) and a method pair 716 that defines an event (i.e., graphically depicted as +addFredListener(T:FredListener):void 717 and +removeFredListener(t:FredListener):void 718 having the same event type of FredListener). In this implementation, identifying the relationships between related elements includes determining whether a property name and type associated with a first element of the group of related elements matches a property name and type of a second element of the group of related elements associated with the single diagram. In addition, identifying the relationships between related elements in this implementation further includes the step of determining whether an event type associated with a third element of the group of related elements matches an event type of a fourth element of the group of related elements. Collapsing the example of FIG. 7 produces the representative symbol 810 shown on screen 800 in FIG. 8. The representative symbol 810 identifies the property type, age:int 813, and the event type, Fred 814 (displayed in a shorter form than FredListener). Collapsing the graphical property/event notations for a Java Bean class diagram advantageously allows the developer to have a higher abstracted view of his/her model.

The method of collapsing disclosed herein includes storing collapsing information associated with producing the representative symbol from the expanded graphical representation of the group of related elements in a graphical view file. In addition, the method prevents source code associated with the code from being altered during the collapsing process.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method in a data processing system for simplifying a graphical representation of code, the code having a plurality of related elements, wherein a first of the plurality of related elements corresponds to a first participant in a pattern, and wherein a second of the plurality of related elements corresponds to a second participant in the pattern, the method comprising the steps of:

receiving a request to further simplify a portion of the preexisting graphical representation of the code associated with the pattern;

determining that the first and the second related elements are related to each other;

displaying a representative symbol in lieu of the preexisting graphical representation of the first and the second related elements responsive to determining that the first and the second related elements are related to each other;

displaying a pattern collapsed tag in association with the representative symbol;

displaying a pattern name in association with the representative symbol;

displaying an identification for the first related element in association with the representative symbol; and displaying an identification for the second related element in association with the representative symbol, wherein the steps are performed by working directly with the code without using a repository for the code.

2. The method of claim 1, wherein the determining step comprises the step of searching a semantic comment field in the code for identification information.

3. The method of claim 1, wherein the determining step comprises the step of searching the code directly for a naming convention related to the first and second participant.

4. The method of claim 1, wherein the determining step comprises the step of searching the code directly for a pattern construct related to the first participant.

5. The method of claim 1, further comprising the step of detecting a third related element in the code corresponding to a third participant in the pattern, wherein the representative symbol is further displayed in lieu of the graphical representation of the third related element.

6. The method of claim 1 further comprising the steps of: receiving a modification to the representative symbol; and editing a portion of the code reflecting the modification to the representative symbol.

7. A method in a data processing system for simplifying a graphical representation of code, the code having a first related element corresponding to a first participant in a pattern and a second related element corresponding to a second participant in the pattern, the method comprising the steps of:

receiving a request to further simplify a portion of the preexisting graphical representation of the code associated with the pattern wherein the preexisting graphical representation of the code is built directly from the source code;

detecting that the first and the second related elements are related to each other;

displaying a representative symbol in lieu of the preexisting graphical representation of the first and the second related elements responsive to determining that the first and the second related elements are related to each other; and displaying a pattern collapsed tag in association with the representative symbol, wherein the steps are performed by working directly with the code without using a repository for the code.

8. The method of claim 7, wherein the determining step comprises the step of searching the code for identification information in a semantic comment field in the code.

9. The method of claim 7, wherein the determining step comprises the step of searching the code for a naming convention related to the first participant.

10. The method of claim 7, wherein the determining step comprises the step of searching the code for a pattern construct related to the first participant.

11. The method of claim 7, wherein the code has a third related element corresponding to a third participant in a pattern, the method further comprising the step of:

determining that the third related element is related to the first and the second related element; and displaying the representative symbol in lieu of the preexisting graphical representation of the third related element responsive to detecting that the first, the second and the third related elements are related to each other.

12. The method of claim 7 further comprising the steps of:

receiving a modification to the representative symbol; and editing a portion of the code reflecting the modification to the representative symbol.

13. A method in a data processing system for simplifying a graphical representation of code, the code having a first related element corresponding to a first participant in a pattern and a second related element corresponding to a second participant in the pattern, the method comprising the steps of:

determining that the first and the second related elements are related to each other; and displaying a representative symbol in lieu of the preexisting graphical representation of the first and the second related elements responsive to determining that the first and the second related elements are related to each other, wherein the steps are performed by working directly with the code without using a repository for the code.

14. The method of claim 13, wherein the determining step comprises the step of searching the code for identification information in a semantic comment field in the code.

15. The method of claim 13, wherein the determining step comprises the step of searching the code for a naming convention related to the first participant.

16. The method of claim 13, wherein the determining step comprises the step of searching the code for a pattern construct related to the first participant.

17. The method of claim 13, further comprising the step of:

detecting a third related element in the code corresponding to a third participant in the pattern, wherein the representative symbol is further displayed in lieu of the preexisting graphical representation of the third related element.

18. The method of claim 13 further comprising the steps of:

receiving a modification to the representative symbol; and editing a portion of the code reflecting the modification to the representative symbol.

19. A computer-readable medium containing instructions for controlling a data processing system to perform a method, the data processing system having code having a plurality of related elements, wherein a first of the plurality of related elements corresponds to a first participant in a pattern, and a second of the plurality of related elements corresponds to a second participant in the pattern, the method comprising the steps of:

receiving a request to further simplify a portion of the preexisting graphical representation of the code associated with the pattern;

determining that the first and the second related elements are related to each other;

displaying a representative symbol in lieu of the preexisting graphical representation of the first and the second related elements responsive to determining that the first and the second related elements are related to each other;

displaying a pattern collapsed tag in association with the representative symbol;

displaying a pattern name in association with the representative symbol;

displaying an identification for the first related element in association with the representative symbol; and displaying an identification for the second related element in association with the representative symbol, wherein the steps are performed by working directly with the code without using a repository for the code.

20. The computer-readable medium of claim 19, wherein the determining step comprises the step of searching the code for identification information in a semantic comment field in the code.

21. The computer-readable medium of claim 19, wherein the determining step comprises the step of searching the code for a naming convention related to the first participant.

22. The computer-readable medium of claim 19, wherein the determining step comprises the step of searching the code for a pattern construct related to the first participant.

23. The computer-readable medium of claim 19, wherein the method further comprises the step of:

detecting a third related element in the code corresponding to a third participant in the pattern, wherein the representative symbol is further displayed in lieu of the preexisting graphical representation of the third related element.

24. The computer-readable medium of claim 19, wherein the method further comprises the steps of:

receiving a modification to the representative symbol; and editing a portion of the code reflecting the modification to the representative symbol.

25. A computer-readable medium containing instructions for controlling a data processing system to perform a method, the data processing system having code having a first related element corresponding to a first participant in a pattern and a second related element corresponding to a second participant in the pattern, the method comprising the steps of:

receiving a request to further simplify a portion of the preexisting graphical representation of the code associated with the pattern;

detecting that the first and the second related elements are related to each other;

displaying a representative symbol in lieu of the preexisting graphical representation of the first and the second related elements responsive to determining that the first and the second related elements are related to each other; and displaying a pattern collapsed tag in association with the representative symbol, wherein the steps are performed by working directly with the code without using a repository for the code.

26. The computer-readable medium of claim 25, wherein the determining step comprises the step of searching the code for identification information in a semantic comment field in the code.

27. The computer-readable medium of claim 25, wherein the determining step comprises the step of searching the code for a naming convention related to the first participant.

28. The computer-readable medium of claim 25, wherein the determining step comprises the step of searching the code for a pattern construct related to the first participant.

29. The computer-readable medium of claim 25, wherein the method further comprises the step of:

detecting a third related element in the code corresponding to a third participant in the pattern, wherein the representative symbol is further displayed in lieu of the preexisting graphical representation of the third related element.

30. The computer-readable medium of claim 25, wherein the method further comprises the steps of:

receiving a modification to the representative symbol; and editing a portion of the code reflecting the modification to the representative symbol.

31. A computer-readable medium containing instructions for controlling a data processing system to perform a method, the data processing system having code having a first related element and a second related element, the method comprising the steps of:

detecting that the first and the second related elements are related to each other; and displaying a representative symbol in lieu of the preexisting graphical representation of the first and the second related elements responsive to determining that the first and the second related elements are related to each other, wherein the steps are performed by working directly with the code without using a repository for the code.

32. The computer-readable medium of claim 31, wherein the determining step comprises the step of searching the code for identification information in a semantic comment field in the code.

33. The computer-readable medium of claim 31, wherein the determining step comprises the step of searching the code for a naming convention related to the first participant.

34. The computer-readable medium of claim 31, wherein the determining step comprises the step of searching the code for a pattern construct related to the first participant.

35. The computer-readable medium of claim 31, wherein the method further comprises the step of detecting a third related element in the code corresponding to a third participant in the pattern, wherein the representative symbol is further displayed in lieu of the preexisting graphical representation of the third related element.

36. The computer-readable medium of claim 31, wherein the method further comprises the steps of:

receiving a modification to the representative symbol; and editing a portion of the code reflecting the modification to the representative symbol.

37. A data processing system comprising:

a secondary storage device further comprising code having a first related element corresponding to a first participant in a pattern and a second related element corresponding to a second participant in the pattern;

a memory device further comprising a program that receives a request to further simplify a portion of a preexisting graphical representation of the code associated with the pattern; that determines whether the first and the second related elements are related to each other; that displays a representative symbol in lieu of the preexisting graphical representation of the first related element and the second related element responsive to the first and the second related elements being related to each other; and that displays a pattern collapsed tag in a processor for running the program, wherein the steps are performed by working directly with the code without using a repository for the code.

38. The data processing system of claim 37, wherein when determining that the first and the second related elements are related to each other, the program searches the code for identification information in a semantic comment field in the code.

39. The data processing system of claim 37, wherein when determining that the first and the second related elements are related to each other, the program searches the code for a naming convention related to the first participant.

40. The data processing system of claim 37, wherein when determining that the first and the second related elements are related to each other, the program searches the code for a pattern construct related to the first participant.

41. The data processing system of claim 37, wherein the program further detects a third related element in the code corresponding to a third participant in the pattern, wherein the representative symbol is further displayed in lieu of the preexisting graphical representation of the third related element.

42. The data processing system of claim 37, wherein the program further:

receives a modification to the representative symbol; and edits a portion of the code reflecting the modification to the representative symbol.

43. A system for further simplifying a preexisting graphical representation of code, the code having a first related element and a second related element, the system comprising:

means for determining that the first and the second related elements are related to each other; and means for displaying a representative symbol in lieu of the preexisting graphical representation of the first and the second related elements responsive to detecting that the first and the second related elements are related to each other, wherein the steps are performed by working directly with the code without using a repository for the code.

* * * * *